United States Patent [19]

Hulyalkar et al.

[11] 4,417,015
[45] Nov. 22, 1983

[54] LOW TOXIC POLYVINYLCHLORIDE STABILIZERS

[75] Inventors: Ramchandra K. Hulyalkar, Oakland; Gerald A. Baum, Paramus, both of N.J.; Kanayo Hotchandani, Yonkers, N.Y.

[73] Assignee: Dart Industries Inc., Northbrook, Ill.

[21] Appl. No.: 232,108

[22] Filed: Feb. 6, 1981

[51] Int. Cl.³ .................... C08K 5/59; C08K 5/09; C08K 5/36; C08K 15/12

[52] U.S. Cl. .................... 524/139; 260/440; 524/177

[58] Field of Search .................... 260/446, 45.75 B; 524/177, 139

[56] References Cited

U.S. PATENT DOCUMENTS

| | | | |
|---|---|---|---|
| 2,680,726 | 6/1954 | Weinberg et al. | 260/446 X |
| 2,684,956 | 7/1954 | Weinberg et al. | 260/446 X |
| 3,340,285 | 9/1967 | Remes et al. | 260/446 |
| 3,399,220 | 8/1968 | Remes et al. | 260/446 |
| 3,466,261 | 9/1969 | Mauz et al. | 260/45.75 B |
| 3,530,158 | 9/1970 | Leebrick et al. | 260/446 |
| 3,887,108 | 6/1975 | Dieckmann | 260/45.75 B X |
| 3,919,168 | 11/1975 | Dieckmann | 260/45.75 B X |
| 4,231,895 | 11/1980 | Dworkin | 260/45.75 B X |
| 4,269,731 | 5/1981 | Mack | 260/446 X |
| 4,279,806 | 7/1981 | Muldrow | 260/446 X |

Primary Examiner—Helen M. S. Sneed
Attorney, Agent, or Firm—Bryant W. Brennan; Leigh B. Taylor

[57] ABSTRACT

Liquid antimony organic sulfur-containing compounds are rendered stable at ambient conditions by incorporating an effective amount of an ethoxylated organo phosphate ester. The stable liquid compositions contribute to the stability of vinyl halide resins.

12 Claims, No Drawings

LOW TOXIC POLYVINYLCHLORIDE STABILIZERS

BACKGROUND OF THE INVENTION

Antimony organic sulfur-containing compounds are well known as stabilizers for vinyl halide resins to guard against degradation by heat during molding and working of the resin into useful articles. Prior art patents which disclose such antimony organic sulfur-containing compounds and their utility as stabilizers include U.S. Pat. Nos. 2,680,726; 2,684,956; 3,340,285; 3,399,220; 3,466,261 and 3,530,158. In past commercial practice, however, the antimony mercaptides have not been widely used as stabilizers because of various shortcomings including, for example, their propensity to exude from molded or worked PVC plastic stock, cost or lack of other advantages associated with their use which might outweigh such shortcomings. U.S. Pat. No. 3,887,508 is directed to improvements in the utilization of antimony organic sulfur-containing compounds in combination with metal carboxylates. As described in U.S. Pat. No. 3,887,508, the utility and efficiency of such antimony compounds are improved in the heat stabilization of vinyl halide resins to an unexpected degree. It has been observed, however, that such antimony compounds which are normally liquid tend to deteriorate or become unstable upon storage.

The problem is particularly important with respect to antimony tris-isooctyl thioglycolate which has secured NSF approval for use in pipe for potable water. Antimony tris-isooctyl thioglycolate is unstable and hydrolyzes on exposure to moisture and air and, hence, requires stabilization. Tert-butyl catechol (TBC) has been widely employed as a stabilizer for commercial antimony stabilizers. However, TBC is itself colored and has been known to react with ingredients in rigid vinyl halide formulations. Therefore, it remains an objective of the industry to provide an efficient stabilizing agent for the antimony organic sulfur-containing compounds, particularly for antimony tris-isooctyl thioglycolate.

SUMMARY OF THE INVENTION

The present invention is directed to further improvements in vinyl halide resin stabilizer systems of antimony organic sulfur-containing compounds. The invention described herein in one of its aspects provides for synergistic heat stabilizer compositions of antimony compounds as stabilizers and ethoxylated organo-phosphate esters which are liquid and shelf-stable at ambient temperatures. Such stable liquid compositions are easily formulated into vinyl halide resin systems and offer synergistically heat stabilized resin systems with enhanced resistance to both early discoloration and long term heat degradation of molded plastics. It has been found that antimony organic sulfur-containing compounds are rendered shelf-stable with certain ethoxylated organo-phosphate esters.

For example, liquid antimony organic sulfur-containing compounds, include antimony mercaptoacid esters, tend to deteriorate upon standing. Such deterioration is observed by the formation and/or precipitation of solids in the liquid compounds. The precise reason for this deterioration phenomenon is unknown. Nevertheless, the resulting heterogeneous liquids not only increase the problems of measuring and mixing the antimony compounds into vinyl halide resins for stabilization, but practically speaking, heterogeneity causes a dissolute appearance which reduces the marketability of the antimony stabilizers. Now, according to the present invention, liquid antimony compounds are rendered shelf-stable at ambient temperatures by the incorporation of an ethoxylated organo-phosphate ester.

There are certain generally preferred weight ratios of the antimony organic sulfur-containing compounds relative to a particular ester in order to achieve stability. However, it is to be emphasized that the most desirable weight ratios of each of the essential components of the composition of this invention for a particular application can be arrived at in accordance with the teachings of this invention. Thus, in its broader aspects, this invention is not limited to weight ratios of components. It has also been found that levels of a particular ester in a particular antimony organic sulfur-containing compound to achieve optimum stabilities under certain conditions may vary. In general, the ester is combined with the antimony organic sulfur-containing compound in an amount of about 0.1 to about 5.0 percent by weight of the antimony compound. Preferably, the esters will be employed in the range of from about 0.5 to about 5.0 percent by weight of the antimony compound.

ANTIMONY ORGANIC SULFUR-CONTAINING COMPOUND

The antimony organic sulfur-containing compounds which are shelf-stabilized according to this invention are generally characterized as having the Sb—S group or linkage. Such antimony compounds may be liquids at normal or room temperatures and atmospheric conditions. On the other hand, such antimony compounds may be solids at normal temperatures and many soften or melt at elevated temperatures. Therefore, liquid stability at ambient conditions can be achieved where the antimony compound is either in the normal liquid, hot melt, or solvent-containing state at room or ambient temperatures and pressures where such compounds tend to undergo degradation due to the ambient conditions. In a most preferred form, the stabilization is achieved in liquid compositions which are shelf-stable at room or ambient temperatures. Such liquid compositions can be readily measured and mixed with other compositions, and are thus easy to formulate, market and use.

Generally, most antimony organic compounds suitable for use in this invention are derived from trivalent antimony and include mercaptides which may be characterized by the following formula:

$$Sb(SR)_3 \qquad \text{FORMULA I}$$

wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula Sb(SR)₃ or a similar formula and a definition of compounds represented thereby include U.S. Pat. Nos. 2,684,956 and 3,466,261, among others.

Antimony organic sulfur-containing compounds other than the antimony mercaptides of the Formula I above, are suitable for use according to this invention. Such compounds are generally termed antimony mercaptoacid esters which may be further defined by the following formula:

   FORMULA II wherein R is selected from the group consisting of alkylene, arylene, and aralkylene radicals and R' is a substituted or unsubstituted alkyl, aryl or mixed aryl-alkyl group. Thus R may be derived from mercapto acetic, β-mercaptopropionic, thiomalic, thiosalicyclic acids, etc. Similarly, R' may be derived from decanols, glycerol, glycol, monoesters, dihydroabietyl alcohol, phenoxyethanol, pentaerythritol, etc. Particularly suitable are the esters of mercapto alcohols, such as thioglycols, in which the hydroxy groups are esterified by an aliphatic, aromatic or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapo acids, such as esters of beta thiopropionic acid, thiolactic acid, thiobutyric acid and mercapto lauric acid. Specific examples of antimony mercaptoacid esters include antimony tris(isooctylthioglycolate), antimony tris(glycoldimercaptoacetate), antimony tris(dodecylthioglycolate, dodecylmercaptoantimony bis(isooctylthioglycolate), and antimony tris(isooctyl-β-mercaptopropionate). Patents exemplifying Formula II or a similar formula and a definition of compounds represented thereby include U.S. Pat. Nos. 2,680,726 and 3,530,158, among others.

The antimony organic sulfur-containing compounds having the Sbs group represented by Formulas I and II come within the scope of a broader characterization illustrated by the following formula:

   FORMULA III wherein R is selected from the group consisting of alkyl, alkenyl, alkynyl, aryl, cycloalkyl, cycloalkenyl, and mixed aryl-alkyl, and substituted groups thereof; where X is selected from the group consisting of sulfide (sulfur) or mercaptide and n is an integer of 0 to 2. Of course, other X groups are SR and SRCOOR' defined by Formulas I and II above wherein R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof. This is also apparent, and with reference to the above incorporated U.S. Pat. No. 3,530,158, that when X is divalent, e.g. sulfide, the compound may be RSbX as exemplified hereinafter by n-butyl antimony sulfide when n of $R_n$ in Formula III is 1 and where n of $X_{3-n}$ is 2. It is therefore appreciated that the formulas herein are merely representative indicia of the class of antimony compounds which respond to the teachings of this invention. In the compounds, $R_nSbX_{3-n}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e. allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenlethynyl, ethynyl, etc. Typical aryl groups which may be employed may include phenyl, tolyl, xylyl, chlorophenyl, dimethylaminophenyl, etc. Where more than one R or X is present in Formula III, such groups may be the same or different. Typical mercaptides include phenyl mercaptide, lauryl mercaptide, butyl mercaptide, or dimercaptides including aliphatic, cycloaliphatic, or aromatic dimercaptans of the R groups disclosed herein, etc. Specific compounds when n is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony alkylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,530,158 and 3,399,220. Where the R group is aryloxy, alkyloxy, alkaryloxy, acyloxy, etc. specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid esters, etc., per se form no part of this invention and the mentioned patents and their specific disclosures clearly teach these compounds and their method of production to enable anyone of ordinary skill to use them in carrying out this invention.

THE ESTERS

The ethoxylated organo-phosphate esters employed in the stabilization of antimony organic sulfur-containing compounds can be represented by the following formula:

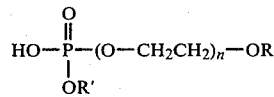

wherein R is an alkyl group having a carbon chain length of from 8 to 18 carbon atoms, R' is hydrogen or an alkyl group having a carbon chain length of from 8 to 18 carbon atoms, or a polyethoxylated alkyl or aryl ether such as $(CH_2CH_2O)_n$—OR, and n is an integer from 1 to 30. The alkyl groups include straight or branched chain groups and can be, for example, any of the following groups: octyl, isooctyl, nonyl, decyl, undecyl, dodecyl, tetradecyl, octadecyl, and the like.

The principles of this invention and its operating parameters will be further understood with reference to the following detailed examples which serve to illustrate the types of specific materials and their amounts as used in the stabilization of antimony compounds according to this invention. These examples are considered to be exemplary of this invention and should not be considered as limiting, especially in view of applicant's broad disclosure of principles of this invention.

In the example of Table I which follows, various combinations of an antimony organic sulfur-containing compound and an ethoxylated organo-phosphate ester were blended together to form a liquid composition on a parts by weight basis. All amounts of components are on a percent by weight basis, or as indicated, simply "%". The esters were incorporated in a liquid antimony tris-isooctylthioglycolate (ATG) on the basis of about 0.1 to about 4 percent by weight of the antimony compound as indicated in the tables. The hydrolytic stabilities of the resulting blends of ATG and t-butyl catechol (TBC) or ATG and butylated hydroxytoluene (BHT) were determined and the results are reported in Table I.

TABLE I

| HYDROLYTIC STABILITY OF $Sb(IOTG)_3$ | | |
|---|---|---|
| Stabilizer | % | Stability in Min. |
| — | — | 25 |
| TBC | 2.5 | 60 |
| TBC | 5.0 | 87 |
| BHT | 5.0 | 27 |
| Gafac RS-410* | 1.0 | 73 |
| Gafac RS-410* | 2.0 | 108 |
| Gafac RS-410* | 4.0 | 180 |
| Gafac RE-610* | 1.0 | 45 |
| Gafac RE-610* | 2.5 | 88 |

*The Gafac RS products used are ethoxylated organophosphate esters marketed by GAF Corporation.

The accelerated hydrolysis test used to determine the hydrolytic stabilities were carried out in an apparatus assembled to supply moist air to liquid antimony samples containing varying amounts of stabilizers. An air supply was connected to a flow meter and through a hose to a 1000 ml vacuum flask containing 750 mls water. After bubbling through the water, the air was conducted through a glass tube to a 400 ml beaker containing 150 grams of antimony tris-isooctylthioglycolate heated to 260° F. for bubbling through the liquid. Procedurally, the antimony liquid was charged into the beaker and desired percents of stabilizers were added to liquid samples. Then, the liquid was stirred under a temperature held at 127° C. with 2 SCFH of air supplied. With the passage of time in minutes, the moment of turbidity was recorded as the time at which the centrally located glass tube in the beaker evolving air could no longer be seen when viewed through the side of the beaker.

In the example of Table II, rigid polyvinyl chloride formulations employing an ethoxylated organo-phosphate ester and TBC, respectively, as stabilizers for the antimony organic sulfur-containing compound recited were evaluated by aging in a circulating air oven. The quantities of ingredients of the formulations are given in parts by weight.

TABLE II

| Evaluation of Stabilized Antimony Tris-isooctyl Thioglycolate in Rigid PVC Formulations | | | | |
|---|---|---|---|---|
| | Single Screw Formulation | | Twin Screw Formulation | |
| Geon 103 EP | 100 | 100 | 100 | 100 |
| $TiO_2$ | 1.0 | 1.0 | 1.0 | 1.0 |
| Atomite | 3.0 | 3.0 | 3.0 | 3.0 |
| Advawax 165 | 1.0 | 1.0 | 1.0 | 1.0 |
| $Sb(IOTG)_3$ + 5% TBC | 0.8 | — | 0.4 | — |
| $Sb(IOTG)_3$ + 2% Gafac RS410 | — | 0.8 | — | 0.4 |
| Calcium Stearate | 1.0 | 1.0 | 0.5 | 0.5 |
| E.C. (Min.) | 15 | 20 | 15 | 15 |
| LTHS (Min.) | 35 | 45 | 30 | 30 |

Milling at 360° F. for 5 min.
Heat Aging at 375° F.

In the formulations given above certain materials are identified by trade designations. Geon 103 EP is a polyvinyl chloride available from B. F. Goodrich and is characterized as a white powder which passes through a 42 mesh screen, with a specific gravity of 1.40 and has a molecular weight of 200,000. Atomite is a natural, water-ground calcium carbonate. Advawax 165 is paraffin wax with a melting point of 165° C. TBC is tert-butyl catechol. Gafac RS-410 is an ethoxylated organophosphate ester.

In this example, the ingredients of the formulations are thoroughly admixed and the resulting mixtures milled on an electrically heated two-roll mill at a temperature of 360° F. for a period of five (5) minutes after the mixtures were banded on the mill.

In carrying out the tests whose results are reported in Table I, aging was carried out using a circulating air oven at 375° F.±1° F. 1"×1" samples were cut from the milled sheet and placed on a metal sheet covered with aluminum foil, kept in the oven and removed at 5-minute intervals. The early color stability (EC) was indicated in minutes at which the first color change (slight yellow) was observed. The long term stability (LTHS) was indicated in minutes at which samples become dark brown or black.

As developed above, the antimony compound may be liquid in its normal state, i.e. at room temperature and atmospheric pressure. Also, the antimony compound may be rendered liquid by the addition of a solvent. For example, in this connection, antimony tris(lauryl mercaptide) is a pasty solid at ambient temperatures. A composition of 50% hydrocarbon solvent and 50% antimony tris(lauryl mercaptide) was formulated and at room temperature and ambient pressure was a clear liquid. When a sample of such a composition was tested for stability under the accelerated procedure described above, a control without stabilizer became opaque after about 35 minutes. The addition of 5% of ethoxylated organophosphate ester greatly extended the stability of the antimony compound containing solution.

It is also to be understood that other components can be used and the benefits of this invention can be achieved. Accordingly, other modifications will become apparent in view of the teachings herein without departing from the true spirit and scope of this invention.

What is claimed is:

1. A liquid antimony composition, stable under ambient conditions, which consists essentially of:

an antimony organic sulfur-containing compound having the formula $$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof; where X of the formula is selected from the group consisting of sulfur, SR and SRCOOR'; where R of the group SR is selected from alkyl, aryl, mixed aryl-alkyl, and substituted groups thereof; where R of the group SRCOOR' is selected from alkylene, arylene, aralkylene, and substituted groups thereof; wherein R' of the group SRCOOR' is selected from alkyl, aryl, mixed aryl-alkyl, and substituted groups thereof and where n is an integer of 0 to 2, and as a stabilizer therefor from about 0.1 to about 5 percent by weight of said compound of an ethoxylated organo-phosphate ester having the formula $$HO-\overset{O}{\underset{OR'}{\overset{\|}{P}}}-(O-CH_2CH_2)_n-OR$$

wherein R is an alkyl group having a carbon chain length of from 8 to 18 carbon atoms, R' is hydrogen or an alkyl group having a carbon chain length of from 8 to 18 carbon atoms, or a polyethoxylated alkyl or aryl ether such as $(CH_2CH_2O)_n$—OR, and n is an integer from about 2 to about 30.

2. The composition of claim 1 which is liquid and shelf-stable at room temperatures for at least several weeks.

3. The composition of claim 1 wherein said antimony compound is selected from the group consisting of antimony tris(isooctylthioglycolate), antimony tris(isooctylmercaptopropionate), dodecylmercaptoantimony bis(isooctylthioglycolate), antimony tris(glycoldimercaptoacetate), and mixtures thereof.

4. The composition of claim 1 wherein the antimony compound is antimony tris-isooctylthioglycolate.

5. The composition of claim 1 wherein said ester has the formula $$HO-\overset{O}{\underset{OH}{\overset{\|}{P}}}-[O-CH_2CH_2]_{7-8}-OR$$

where R is an alkyl group of 12 to 16 carbon atoms.

6. The composition of claim 1 containing said ester in an amount of about 0.5 to about 5% by weight of said compound.

7. A vinyl halide resin composition which comprises a vinyl halide resin and as a stabilizer an effective amount of a composition consisting essentially of an antimony organic sulfur-containing compound having the formula $$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof; where X of the formula is selected from the group consisting of sulfur, SR and SRCOOR'; where R of the group SR is selected from alkyl, aryl, mixed aryl-alkyl, and substituted groups thereof; where R of the group SRCOOR' is selected from alkylene, arylene, aralkylene, and substituted groups thereof; wherein R' of the group SRCOOR' is selected from alkyl, aryl, mixed aryl-alkyl, and substituted groups thereof and where n is an integer of 0 to 2, and as a stabilizer therefor an effective stabilizing amount representing only a minor proportion of said compound of an ethoxylated organo-phosphate ester having the formula $$HO-\overset{O}{\underset{OR'}{\overset{\|}{P}}}-(O-CH_2CH_2)_n-OR$$

wherein R is an alkyl group having a carbon chain length of from 8 to 18 carbon atoms, R' is hydrogen or an alkyl group having a carbon chain length of from 8 to 18 carbon atoms, and n is an integer from about 2 to about 30.

8. The composition of claim 7 wherein the vinyl halide resin is a vinyl chloride resin.

9. The composition of claim 8 wherein the antimony compound is selected from the group consisting of antimony tris(isooctylthioglycolate), antimony tris(isooctylmercaptopropionate), dodecylmercaptoantimony bis(isooctylthioglycolate), antimony tris(glycoldimercaptoacetate), and mixtures thereof.

10. The composition of claim 7 wherein said ester has the formula $$HO-\overset{O}{\underset{OH}{\overset{\|}{P}}}-[O-CH_2CH_2]_{7-8}-OR$$

where R is an alkyl chain having 12 to 16 carbon atoms.

11. The composition of claim 7 wherein the antimony compound is tris-isooctylthioglycolate.

12. The composition of claim 7 wherein the proportion of resin to stabilizing composition is from about 100 to 0.4 to about 100 to 3.00.

* * * * *